(12) United States Patent
Ikebata et al.

(10) Patent No.: US 11,651,176 B2
(45) Date of Patent: May 16, 2023

(54) IMAGE EVALUATION SYSTEM (71) Applicant: KYOCERA Document Solutions Inc., Osaka (JP)

(72) Inventors: Yoshiaki Ikebata, Osaka (JP); Atsushi Ishizaki, Osaka (JP); Lin Lu, Osaka (JP); Ayumi Nakano, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/583,999

(22) Filed: Jan. 25, 2022

(65) Prior Publication Data
US 2022/0245411 A1 Aug. 4, 2022

(30) Foreign Application Priority Data

Jan. 29, 2021 (JP) .............................. JP2021-013012

(51) Int. Cl.
*G06F 3/12* (2006.01)
*G06K 15/02* (2006.01)

(52) U.S. Cl.
CPC ........... *G06K 15/027* (2013.01); *G06F 3/121* (2013.01); *G06F 3/1208* (2013.01); *G06F 3/1234* (2013.01); *G06F 3/1256* (2013.01); *G06F 3/1293* (2013.01)

(58) Field of Classification Search
CPC ... G06K 15/027; G06F 3/1208; G06F 3/1234; G06F 3/1256; G06F 7/06; G06F 7/12

USPC ...... 358/1.14, 1.18, 1.9, 3.26, 504; 382/112, 382/190; 399/15

See application file for complete search history.

(56) References Cited

U.S. PATENT DOCUMENTS

| | | | |
|---|---|---|---|
| 2005/0162686 A1* | 7/2005 | Barrus | H04N 1/00374 358/1.15 |
| 2013/0199388 A1* | 8/2013 | Luengo Bada | B41F 33/0036 101/481 |

FOREIGN PATENT DOCUMENTS

JP 2015-167302 A 9/2015

* cited by examiner

*Primary Examiner* — Jamares Q Washington
(74) *Attorney, Agent, or Firm* — Stein IP, LLC (57) ABSTRACT

An image evaluation system includes an image forming apparatus and an information processing apparatus. The image forming apparatus prints a reference document including pattern images. The image forming apparatus prints, on the reference document, a check region including check items with respect to the image quality of the printed result. The image forming apparatus reads the printed reference document to generate reference document data. The image forming apparatus transmits the generated reference document data to the information processing apparatus. Based on the received reference document data, the information processing apparatus recognizes a check item selected in the check region.

8 Claims, 8 Drawing Sheets

IMAGE EVALUATION SYSTEM

INCORPORATION BY REFERENCE

This application is based on and claims the benefit of priority from Japanese Patent Application No. 2021-013012 filed on Jan. 29, 2021, the contents of which are hereby incorporated by reference.

BACKGROUND

The present disclosure relates to an image evaluation system that prints a document for image quality evaluation (diagnosis) and that, based on the image data of the document, evaluates image quality. The present disclosure also relates to an image forming apparatus that prints a document for image quality evaluation.

As an image forming apparatus is used, image quality may change. Changes in image quality produce various symptoms, which vary from apparatus to apparatus (among individual apparatuses). Changes in image quality result from various causes. To check for notable symptoms (problems) with their alleviation and improvement in mind, it is often practiced to print an image (test chart) to determine current image quality on an image forming apparatus.

SUMMARY

According to one aspect of the present disclosure, an image evaluation system includes an image forming apparatus and an information processing apparatus. The image forming apparatus prints a reference document including a pattern image for evaluating image quality in printing. The image forming apparatus prints on the reference document a check region that includes check items with respect to the image quality of the printed result. The image forming apparatus reads the reference document printed and generates reference document data as the image data of the reference document. The image forming apparatus transmits the generated reference document data to the information processing apparatus. The information processing apparatus receives the reference document data. Based on the received reference document data, the information processing apparatus recognizes check items selected in the check region.

This and other objects of the present disclosure, and the specific benefits obtained according to the present disclosure, will become apparent from the description of embodiments which follows.

DETAILED DESCRIPTION

With reference to FIGS. 1 to 8, an image evaluation system 100 and an image forming apparatus 1 according to an embodiment will be described. Any features in terms of structure, arrangement, and the like mentioned in the description of the embodiment are merely illustrative and are in no way meant to limit the scope of the present disclosure.

Prior to a description of the image evaluation system 100 and the image forming apparatus 1, a description will be given of a known image forming apparatus.

Image forming apparatuses are often installed in companies and in private and public offices. A user (customer) can be in a maintenance contract with a maintenance company for an image forming apparatus that is used for their business. Conventionally, a user who feels a problem in image quality contacts the maintenance company. In response, a maintenance staff member (serviceperson) with expertise is dispatched. The serviceperson diagnoses the image forming apparatus and, as necessary, does repair work as by replacing a part.

Today, whether there is a problem in image quality and what symptom (problem) is actually being encountered can be checked remotely. For example, an image forming apparatus produces a predetermined print result, and the image data of the print result is transmitted to a server, which then makes a diagnosis based on the image data. Before a serviceperson's visit, a problem in image quality that is apparent on the print result can be checked. For the problem grasped remotely, the serviceperson can prepare beforehand a part needed for repair. The serviceperson can take the part with them on their visit.

However, a symptom that a user perceives as a problem (a symptom of concern) may not be apparent on the print result for diagnosis. For example, a symptom of concern does not always occur. The serviceperson may need to talk to and learn from the user what concerns the user. If the serviceperson does not have with them the part that improves the symptom of concern, they have to return to the company to fetch it, or has to order it. Eliminating the symptom of concern may then take time. Unfortunately, a previous remote check of image quality does not always help shorten the time for which image quality remains degraded.

In view of the above-mentioned problems with known image forming apparatuses, an object of the present disclosure is to achieve simultaneous acquisition of image data for image quality evaluation and information on a symptom that a user perceives as of concern, in order to efficiently and promptly check image quality and grasp the symptom that the user perceives as a problem.

Figure 1:
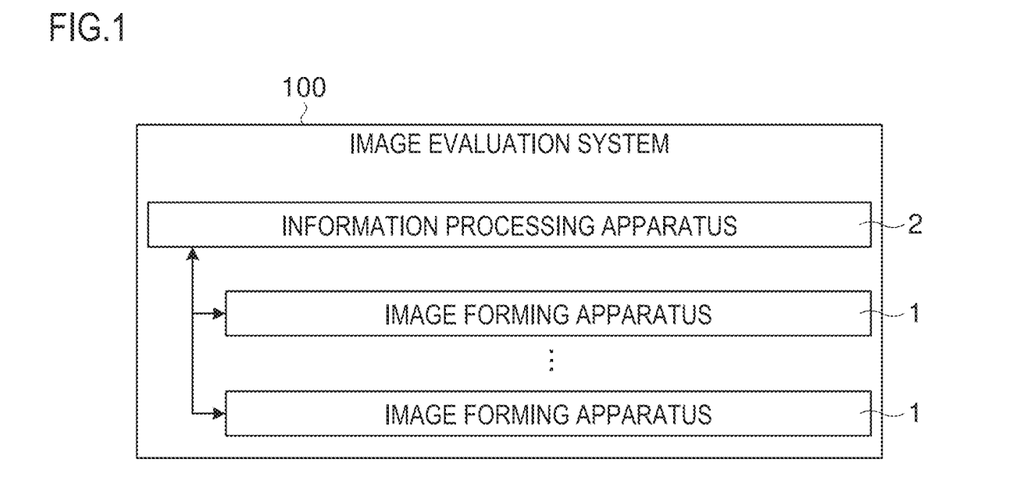
FIG. 1 is a diagram showing one example of an image evaluation system according to an embodiment.

Image Evaluation System 100: With reference to FIG. 1, one example of the image evaluation system 100 according to the embodiment will be described. FIG. 1 is a diagram showing one example of the image evaluation system 100 according to the embodiment.

The image evaluation system 100 includes at least one image forming apparatus 1 and at least one information processing apparatus 2. The image evaluation system 100 may include a plurality of information processing apparatuses 2. As shown in FIG. 1, the image evaluation system 100 may include a plurality of image forming apparatuses 1.

The image forming apparatus 1 and the information processing apparatus 2 are connected together via a wired or wireless communication network so that they can communicate with each other. The image forming apparatus 1 and the information processing apparatus 2 can engage in communication with each other.

The image forming apparatus 1 is an apparatus such as a multifunction peripheral or a printer that can perform printing. The information processing apparatus 2 is a computer. The information processing apparatus 2 is, for example, a server. The information processing apparatus 2 can collect data from the image forming apparatus 1. For example, the information processing apparatus 2 can collect image data from the image forming apparatus 1 and perform evaluation of image quality based on the image data.

Figure 2:
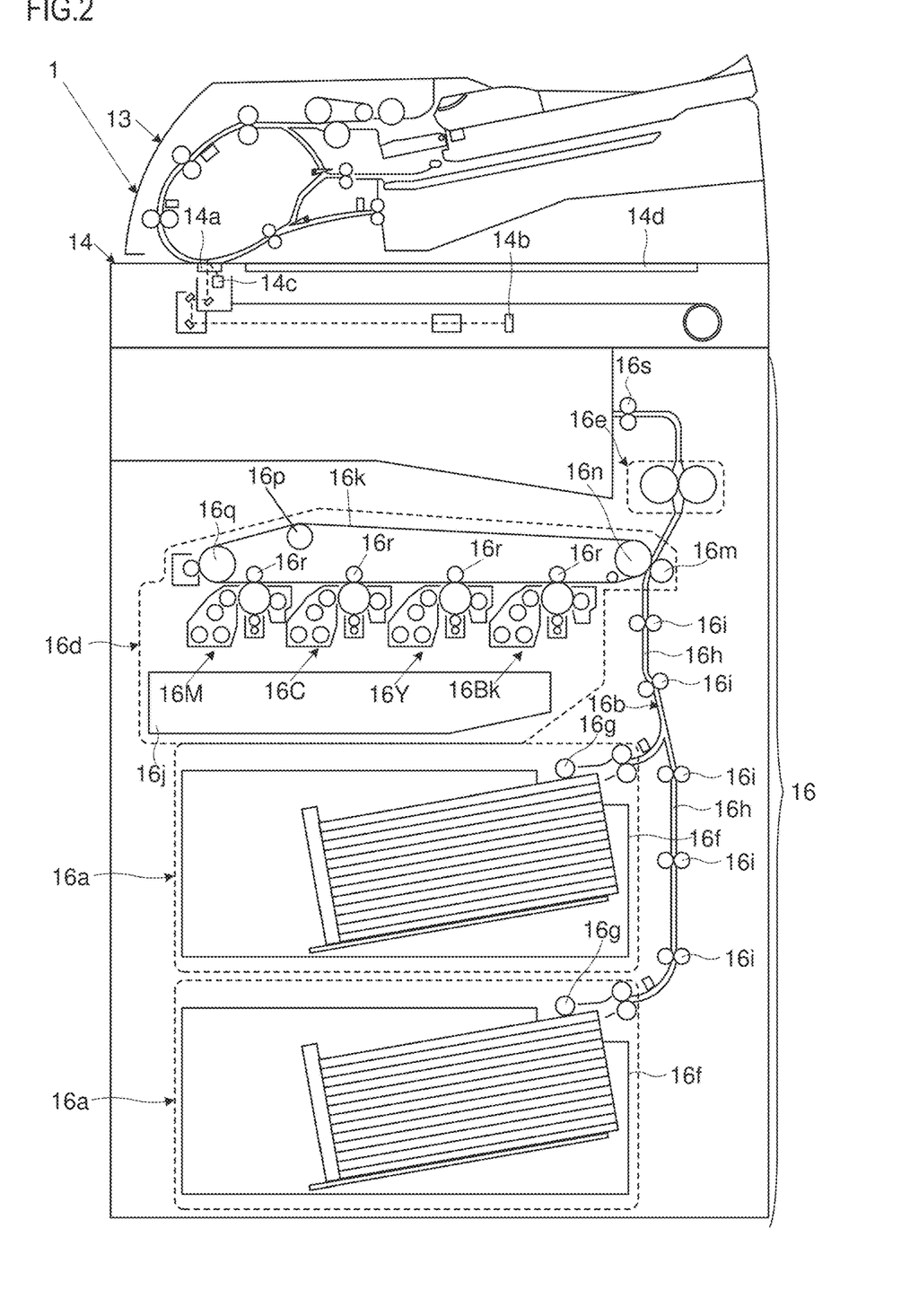
FIG. 2 is a diagram showing one example of an image forming apparatus according to the embodiment.
Figure 3:
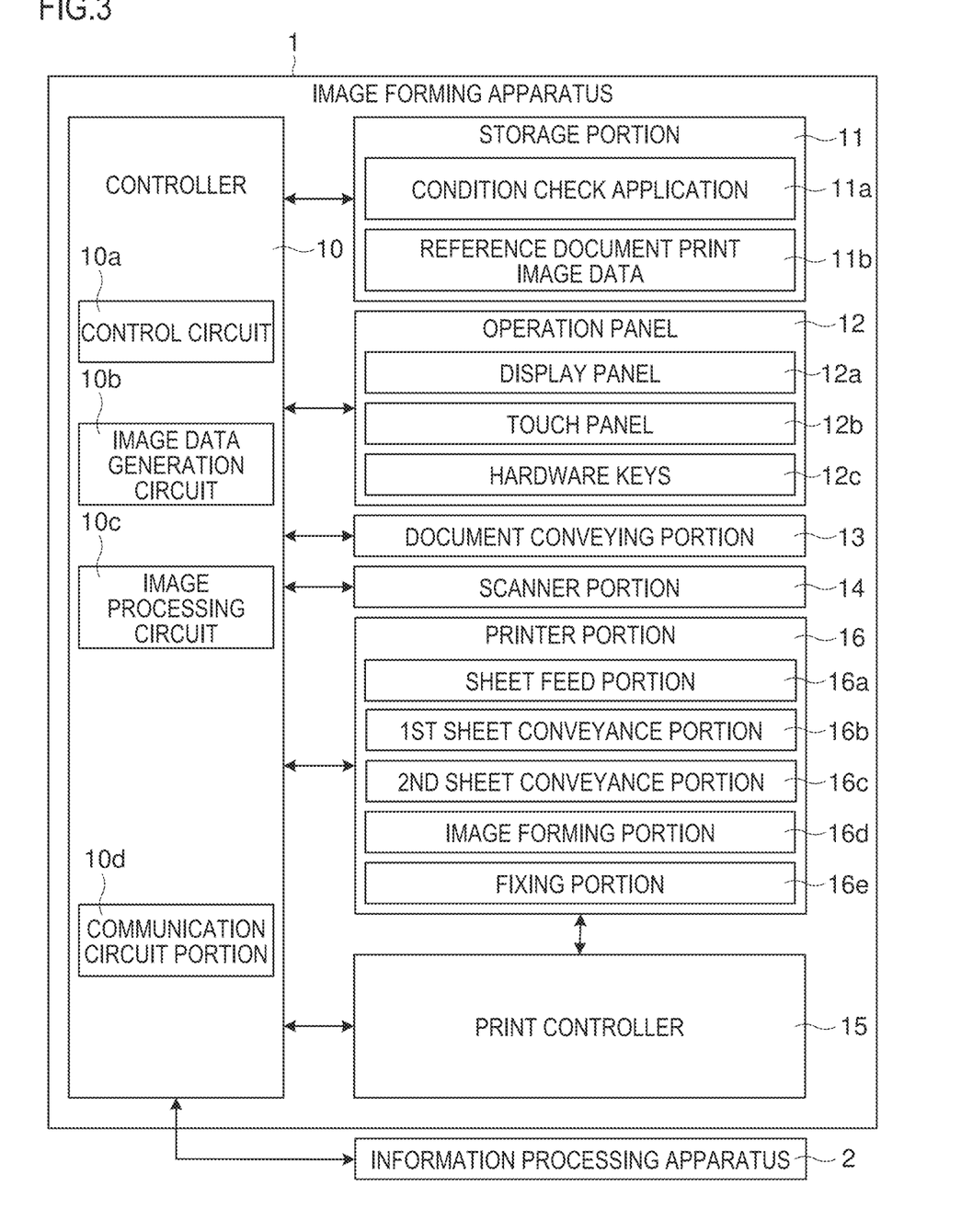
FIG. 3 is a diagram showing one example of an image forming apparatus according to the embodiment.

Image Forming Apparatus 1: Next, with reference to FIGS. 2 and 3, one example of the image forming apparatus 1 according to the embodiment will be described. FIGS. 2 and 3 are diagrams showing one example of the image forming apparatus 1 according to the embodiment. The following description deals with an example where the image forming apparatus 1 is a multifunction peripheral.

As shown in FIG. 2, the image forming apparatus 1 includes a controller 10, a storage portion 11, and an operation panel 12. As shown in FIGS. 1 and 2, the image forming apparatus 1 also incudes a document conveying portion 13, a scanner portion 14 (image reading portion), a print controller 15 (engine controller), and a printer portion 16.

The controller 10 includes a control circuit 10a, an image data generation circuit 10b, an image processing circuit 10c, and a communication circuit portion 10d. The controller 10 is, for example, a circuit board that includes electronic circuits and devices. The control circuit 10a performs processing and calculation related to jobs. The control circuit 10a is, for example, a CPU. The image data generation circuit 10b processes an analog image signal that an image sensor 14b in the scanner portion 14 outputs by reading a document. The image data generation circuit 10b includes, for example, an analog-to-digital conversion circuit. Based on the analog image signal, the image data generation circuit 10b generates the image data of the image that it reads.

The image processing circuit 10c is an integrated circuit for image processing. The image processing circuit 10c is, for example, an ASIC. The image processing circuit 10c performs image processing on image data. The image processing circuit 10c generates, for example, image data for printing. The image processing circuit 10c can generate a file that contains image data. The communication circuit portion 10d includes a communication control circuit and a communication memory. Based on communication software stored in the communication memory, the communication control circuit controls communication. The communication circuit portion 10d communicates with the information processing apparatus 2. The communication circuit portion 10d can also communicate with a computer (PC, server) other than the information processing apparatus 2.

The image forming apparatus 1 includes, as the storage portion 11, a RAM, a ROM, and a storage. The storage is one of a HDD and an SSD or both. Based on programs and data in the storage portion 11, the controller 10 controls different blocks.

The operation panel 12 accepts setting operation by a user. The operation panel 12 includes a display panel 12a, a touch panel 12b, and hardware keys 12c. The controller 10 makes the display panel 12a display messages, setting screens, and operation images. The operation images are, for example, buttons, keys, and tabs. Based on the output of the touch panel 12b, the controller 10 recognizes the operation images operated. The hardware keys 12c include a Start key and numerical keys. The touch panel 12b and the hardware keys 12c. accept setting operation by the user (operation related to jobs). Based on the output of the operation panel 12, the controller 10 recognizes the settings made.

The document conveying portion 13 conveys a set document toward a reading glass 14a (first contact glass). The scanner portion 14 includes an image sensor 14b and a lamp 14c. The scanner portion 14 reads a conveyed document. The scanner portion 14 can also read a document set on a document stage 14d (second contact glass). The scanner portion 14 reads a document and outputs an analog image signal. The image data generation circuit 10b converts the analog image signal to generate document image data.

The printer portion 16 includes a sheet feed portion 16a, a first sheet conveyance portion 16b, a second sheet conveyance portion 16c, an image forming portion 16d, and a fixing portion 16e. The print controller 15 includes a print control circuit (engine CPU) and a print control memory (engine memory). Based on instructions from the controller 10 and programs and data stored in the print control memory, the print control circuit controls the operation of the printer portion 16 and the conveyance of sheets. The print controller 15 controls the operation of the sheet feed portion 16a, the first sheet conveyance portion 16b, the second sheet conveyance portion 16c, the image forming portion 16d, and the fixing portion 16e.

The sheet feed portion 16a feeds sheets. The sheet feed portion 16a includes a sheet cassette 16f and a sheet feed roller 16g. The sheet cassette 16f stores sheets. The sheet feed roller 16g feeds out sheets. In a print job, the print controller 15 makes one sheet feed portion 16a feed out sheets. The first sheet conveyance portion 16b includes a first sheet conveyance passage 16h. The first sheet conveyance portion 16b includes a plurality of guide plates. Through a passage formed by the guide plates, sheets pass. The first sheet conveyance portion 16b conveys sheets from the sheet feed portion 16a to the image forming portion 16d. The first sheet conveyance portion 16b includes a first sheet conveyance motor and a plurality of pairs of first sheet conveyance rollers 16i. The first sheet conveyance motor makes the pairs of first sheet conveyance rollers 16i rotate. Rotating, the pairs of first sheet conveyance rollers 16i feed sheets to the image forming portion 16d.

The image forming portion 16d forms an image (toner image) on a sheet being conveyed. The image forming portion 16d includes image forming units 16Bk, 16Y, 16C, and 16M for four colors, an exposure device 16j, and an intermediate transfer unit. The image forming units 16Bk, 16Y, 16C, and 16M each include a photosensitive drum, a charging device, and a developing device. The image forming unit 16Bk forms a black image, the image forming unit 16Y forms a yellow image, the image forming unit 16C forms a cyan image, and the image forming unit 16M forms a magenta image.

The intermediate transfer unit includes an intermediate transfer belt 16k, a secondary transfer roller 16m, an intermediate drive roller 16n, intermediate driven rollers 16p and 16q, and four primary transfer rollers 16r. The intermediate transfer belt 16k is endless. The intermediate transfer belt 16k is stretched around the rollers mentioned just above. Toner images are primarily transferred from the photosensitive drums to the intermediate transfer belt 16k. The toner images of different colors are overlaid on each other. The secondary transfer roller 16m secondarily transfers the toner images to a sheet. The nip between the secondary transfer roller 16m and the intermediate transfer belt 16k is where the toner images are put on the sheet.

The sheet that has passed through the secondary transfer roller 16m enters the fixing portion 16e. The fixing portion 16e includes a heater and a fixing roller. The print controller 15 makes the fixing roller heat and press the sheet having the toner images transferred to it. The second sheet conveyance portion 16c conveys the sheet having passed through the fixing portion 16e toward a discharge tray. The second sheet conveyance portion 16c includes a second sheet conveyance motor and a pair of second sheet conveyance rollers 16s. The second sheet conveyance motor makes the pair of second sheet conveyance rollers 16s rotate.

Figure 4:
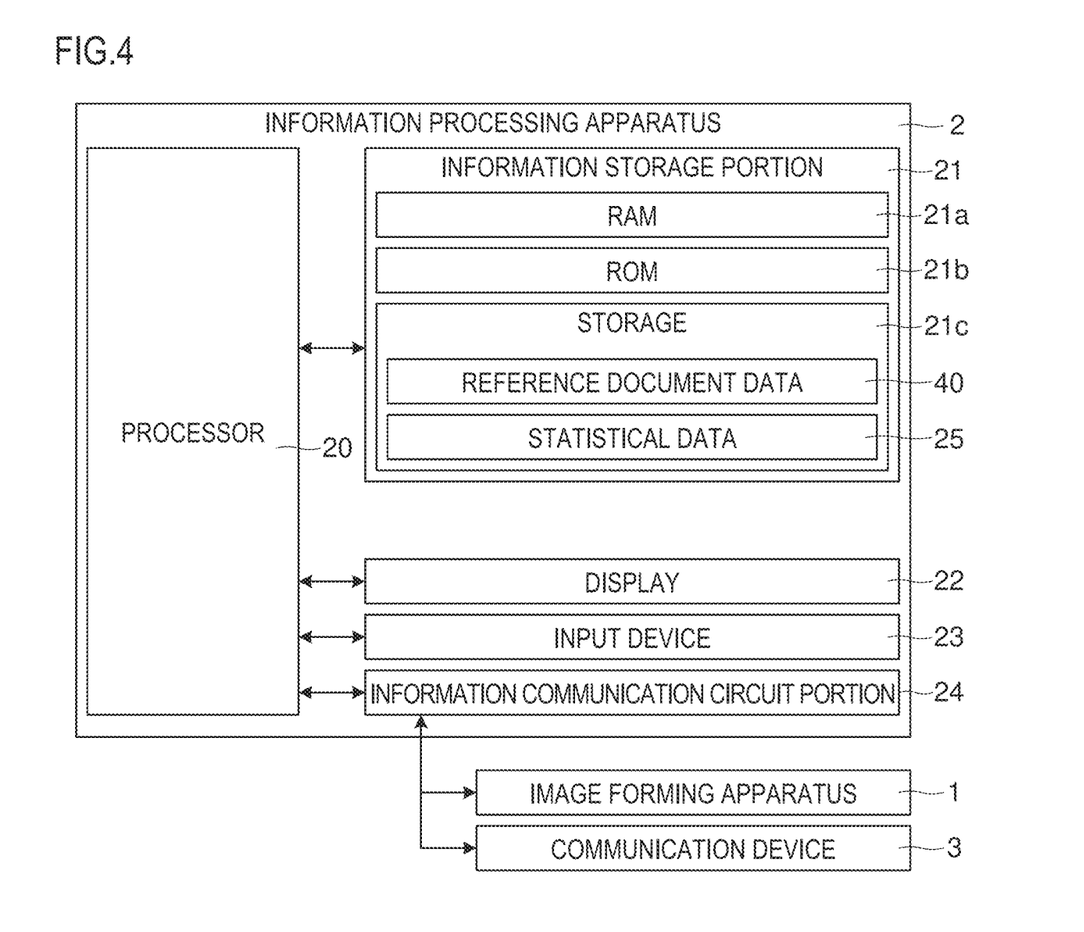
FIG. 4 is a diagram showing one example of an information processing apparatus according to the embodiment.

Information Processing Apparatus 2: Next, with reference to FIG. 4, one example of the information processing apparatus 2 according to the embodiment will be described. FIG. 4 is a diagram showing one example of the information processing apparatus 2 according to the embodiment.

The information processing apparatus 2 includes a processor 20, an information storage portion 21, a display 22, an input device 23, and an information communication circuit portion 24. The processor 20 is a circuit board (control circuit board) that includes a control circuit (CPU). The processor 20 performs calculation and processing. The processor 20 controls the operation of the information processing apparatus 2. The information storage portion 21 includes a RAM 21a, a ROM 21b, and a storage 21c. The storage is, for example, a hard disk drive (HDD). Thus the information storage portion 21 includes a nonvolatile storage device, which can store data and software. The data and software stored in the information storage portion 21 will be described in detail later.

The display 22 includes, for example, a liquid crystal panel or an organic EL panel. The processor 20 makes the display 22 display screens and information. The input device 23 comprises, for example, a keyboard and a mouse. The input device 23 accepts operation by the user. Based on the output of the input device 23, the information processing apparatus 2-recognizes the operation done. The information communication circuit portion 24 communicates with the image forming apparatus 1 and a communication apparatus 3 via a communication network. The processor 20 makes the information storage portion 21 store the data that the information communication circuit portion 24 receives from the image forming apparatus 1. The information storage portion 21 stores data for the maintenance (adjustment) of the image forming apparatus 1. The processor 20 makes the information communication circuit portion 24 transmit to the image forming apparatus 1 the data to be transmitted to it. The processor 20 also makes the information communication circuit portion 24 transmit to the communication apparatus 3 the data to be transmitted to it.

Figure 5:
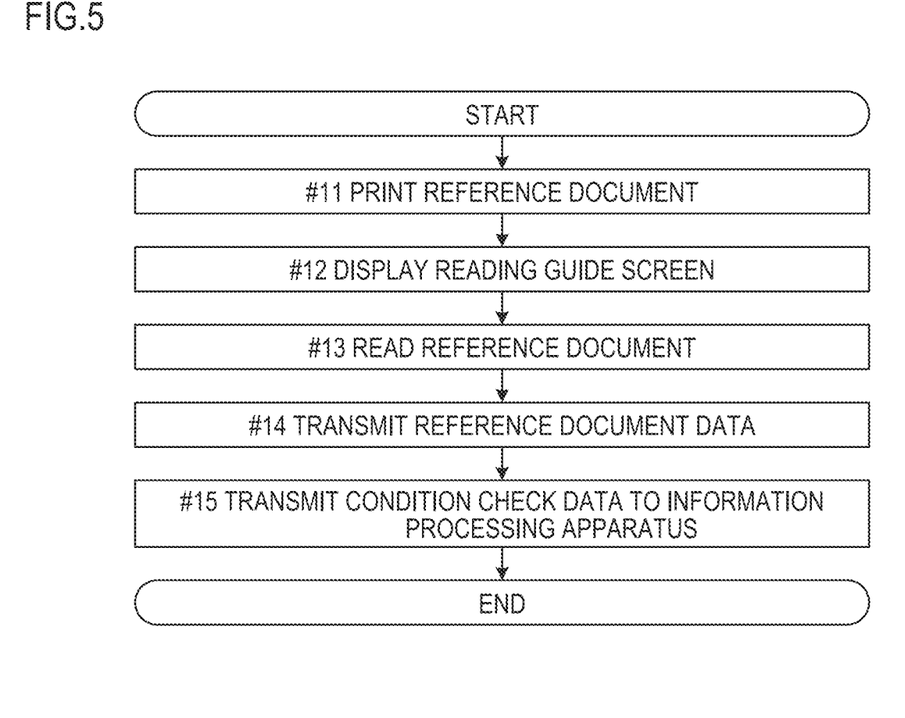
FIG. 5 is a diagram showing one example of the operation of the image forming apparatus according to the embodiment.
Figure 6:
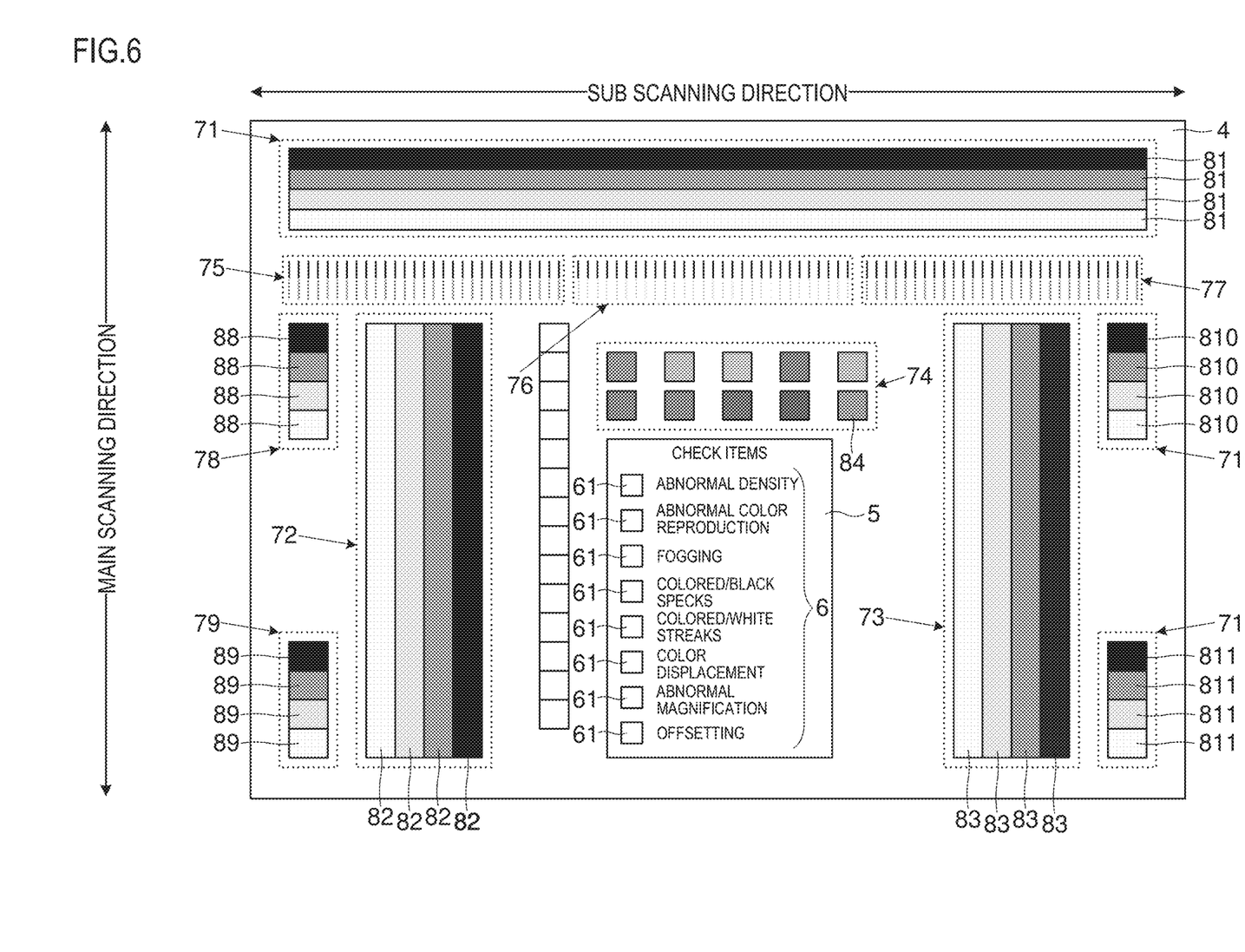
FIG. 6 is a diagram showing one example of a reference document according to the embodiment.
Figure 7:
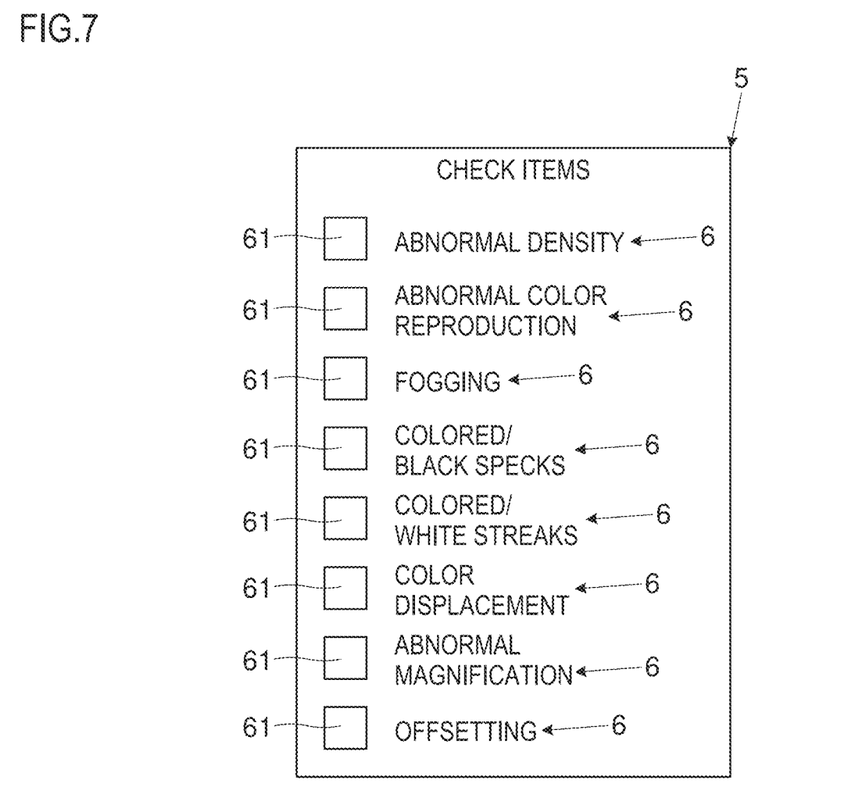
FIG. 7 is a diagram showing one example of a check region according to the embodiment.

Operation of the Image Forming Apparatus 1: Next, with reference to FIGS. 5 to 7, one example of the operation of the image forming apparatus 1 according to the embodiment will be described. FIG. 5 is a diagram showing one example of the operation of the image forming apparatus 1 according to the embodiment. FIG. 6 is a diagram showing one example of a reference document 4 according to the embodiment. FIG. 7 is a diagram showing one example of a check region 5 according to the embodiment.

The image forming apparatus 1 can perform jobs; it can perform, for example, a copy job and a scan transmission job. Apart from those jobs, the image forming apparatus 1 provides an image quality check mode. The image quality check mode is a mode that permits diagnosis (evaluation, inspection) as to image quality on the image forming apparatus 1. Now, with reference to FIGS. 5 to 7, one example of the operation of the image forming apparatus 1 in the image quality check mode will be described.

To use the image quality check mode (to check the condition of the image forming apparatus 1), the user first starts up a condition check application 11a. The condition check application 11a is installed on the storage of the storage portion 11 of the image forming apparatus 1. The condition check application 11a is a software package that includes programs for performing various processes in the image quality check mode. By operating the operation panel 12, the user can start up the condition check application 11a. Based on the condition check application 11a so started up, the controller 10 (control circuit 10a) performs various processes.

The procedure in FIG. 5 starts when the controller 10 starts to operate in response to the condition check application 11a being started up. First the controller 10 makes the printer portion 16 print the reference document 4 (step #11). The storage portion 11 stores reference document print image data 11b (image data for the printing of the reference document 4) (see FIG. 3). Specifically, a nonvolatile storage device included in the storage portion 11 stores the reference document print image data 11b. Based on the reference document print image data 11b, the controller 10 makes the printer portion 16 print the reference document 4. For example, the controller 10 has the reference document 4 printed and output on a sheet of A3 or A4 size. Based on the reference document print image data 11b, the controller 10 has the reference document 4 printed such that it has a pattern image and a check region 5. The pattern image is an image for evaluating image quality in printing. The check region 5 is a region in which check items 6 are printed. The check items 6 are items that are previously defined to check for undesirable symptoms in terms of the image quality of the printed result.

FIG. 6 shows one example of the reference document 4 according to the embodiment. Of what appears in FIG. 6, the rectangle that contains characters in a middle part of the reference document 4 in the sub scanning direction is the check region 5. FIG. 7 is an enlarged view of the check region 5. FIG. 7 shows an example where the check region 5 shows (lists) eight check items 6; abnormal density; abnormal color reproduction; fogging; colored/black specks; colored/white streaks; color displacement; abnormal magnification; and offset. The number of check items 6 shown can be more or less than eight instead of eight as just mentioned.

The controller 10 has a combination of the check items 6 (item designations) with corresponding check boxes 61 printed inside the check region 5. That is, inside the check region 5, the check items 6 and the check boxes 61 are printed. The check boxes 61 have, for example, a square or rectangular shape. The check boxes 61 can have any other shape.

Around the check region 5, a plurality of kinds of pattern image are printed. Printed are, for example, a first pattern image 71, a second pattern image 72, a third pattern image 73, a fourth pattern image 74, a fifth pattern image 75, a sixth pattern image 76, a seventh pattern image 77, an eighth pattern image 78, a ninth pattern image 79, a tenth pattern image 710, and an eleventh pattern image 711.

The first pattern image 71 is an image that extends in the sub scanning direction and that has four strip-like rectangular patch images 71a arrayed in the main scanning direction. The first pattern image 71 is an image that has consolidated in it four rectangular boxes (patch images 81) in black, magenta, cyan, and yellow. The second pattern image 72 is an image that extends in the main scanning direction and that has four strip-like rectangular patch images 82 arrayed in the sub scanning direction. The third pattern image 73 is likewise an image that extends in the main scanning direction and that has four strip-like rectangular patch images 83 arrayed in the sub scanning direction. The second and third pattern images 72 and 73 too are each an image that has consolidated in it four rectangular boxes in black, magenta, cyan, and yellow.

The fourth pattern image 74 includes a plurality of cubic boxes (which can be rectangular boxes). For example, the controller 10 has a different color printed inside each of those cubic boxes 84. The controller 10 puts two or more color materials (toners of different colors) inside each cubic box 84. For the sake of convenience, in FIG. 6 only one of those cubic boxes 84 is indicated by a reference sign.

The fifth, sixth, and seventh pattern images 75, 76, and 77 each include a plurality of black lines that extend in the main scanning direction. In the reference document print image data 11b, the black lines are arrayed at equal intervals in the sub scanning direction. The fifth pattern image 75 includes a plurality of colored lines in magenta that extend in the main scanning direction. The sixth pattern image 76 includes a plurality of colored lines in cyan that extend in the main scanning direction. The seventh pattern image 77 includes a plurality of colored lines in yellow that extend in the main scanning direction. Each colored line is paired with a corresponding one black line (this will be described in detail later).

The eighth pattern image 78 is an image in which a plurality of rectangular boxes in black, magenta, cyan, and yellow (patch images 88) are arrayed in the main scanning direction. The ninth pattern image 79 is likewise an image in which a plurality of rectangular boxes in black, magenta, cyan, and yellow (patch images 89) are arrayed in the main scanning direction. The tenth pattern image 710 is likewise an image in which a plurality of rectangular boxes in black, magenta, cyan, and yellow (patch images 810) are arrayed in the main scanning direction. The eleventh pattern image 711 is likewise an image in which a plurality of rectangular boxes in black, magenta, cyan, and yellow (patch images 811) are arrayed in the main scanning direction.

FIG. 6 is one example of the reference document 4. The reference document 4 can include any images other than the pattern images shown as examples in FIG. 6. While FIG. 6 shows a reference document 4 for color printers, for monochrome printers a reference document 4 for monochrome printers is used After printing the reference document 4, the controller 10 makes the display panel 12a display a reading guide screen for the printed reference document 4 (step #12). For example, the controller 10 has a message displayed in the reading guide screen. For example, the message prompts the user to set the printed reference document 4 on the scanner portion 14 (document stage 14d). When the reference document 4 completes being set, the controller 10 makes the display panel 12a display a message prompting the user to operate the Start button provided on the operation panel 12.

The user checks (puts a check mark in), among the check items 6 in the check region 5, any check box for a symptom of concern (a problem that the user perceives occurring). After the checking, the user sets the printed reference document 4 on the document stage 14d.

When the Start button (hardware key 12c) is operated, the controller 10 makes the scanner portion 14 read the printed reference document 4 (step #13). The condition check application 11a includes data that contains set value data. The set value data is data in which set values for the reading of the reference document 4 are defined. For example, defined as set values in the set value data are, for example, reading at the maximum resolution, reading in colors, and reading at a magnification of 100%. Based on the set values in the set value data, the controller 10 has the reference document 4 read. The user does not need to makes settings for reading. Based on the analog image signal output from the scanner portion 14, the controller 10 generates reference document data 40 (step #14). The reference document data 40 is the image data of the reference document 4 (an image file obtained by reading the reference document 4).

The controller 10 then transmits condition check data to the information processing apparatus 2 (step #15). The condition check data includes the generated reference document data 40. Where to find (the address of) the information processing apparatus 2 (transmission destination) is previously registered in the condition check application 11a. The controller 10 can include information on the transmission source apparatus in the condition check data. The controller 10 can include in the condition check data, for example, information such as the address, manufacturing number, serial number, model name of the image forming apparatus 1, the names of users registered in the image forming apparatus 1, and the addresses of the maintenance company and personnel (servicepersons) registered in the image forming apparatus 1.

Figure 8:
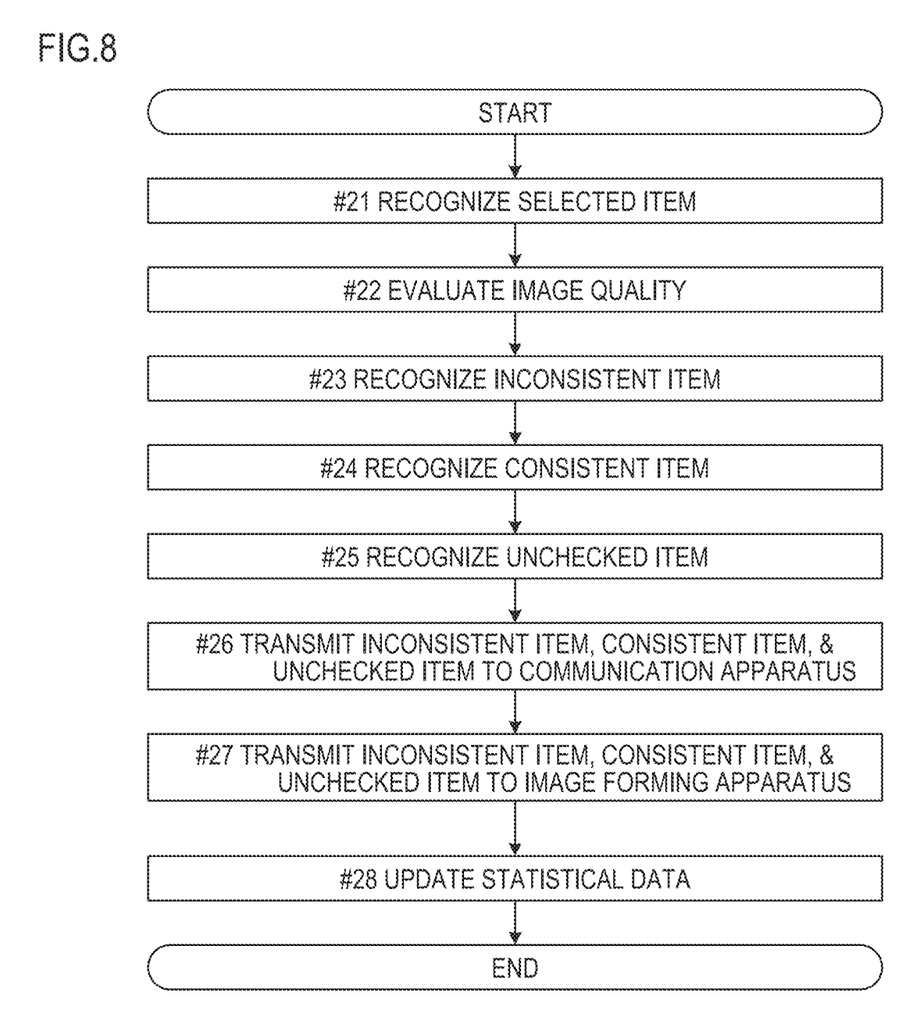
FIG. 8 is a diagram showing one example of the operation of the information processing apparatus according to the embodiment.

Operation of the information processing apparatus 2: Next, with reference to FIG. 8, one example of the operation of the information processing apparatus 2 according to the embodiment will be described. FIG. 8 is a diagram showing one example of the operation of the information processing apparatus 2 according to the embodiment.

The procedure in FIG. 8 starts when the information processing apparatus 2 receives condition check data. The information storage portion 21 (a nonvolatile storage device such as the storage 21c) can store the received reference document data 40 (condition check data) (see FIG. 4). Based on the reference document data 40 contained in the condition check data, the processor 20 in the information processing apparatus 2 recognizes a check item 6 selected in the check region 5 (step #21). The processor 20 recognizes as a selected check item 6 a check item 6 for which the check box is checked. The processor 20 recognizes as an unselected check item 6 a check item 6 for which the check box is not checked.

The number of check boxes 61 arrayed in the main scanning direction in the check region 5 is previously determined. The order in which the check items 6 are arrayed in the main scanning direction is also previously determined. The position of the check region 5 is previously determined. Accordingly, the processor 20 can recognize as a check box 61 a rectangular box that is found in the area occupied by the check region 5 in the reference document data 40. The processor 20 then recognizes the check item 6 that corresponds to each such rectangular box (check box 61).

The processor 20 then recognizes the number of high-density pixels (pixels with densities higher than a predetermined value) inside the check box 61 (rectangular box). The processor 20 recognizes a check box 61 in which the number of high-density pixels is greater than the predetermined value as a checked check box 61. The processor 20 recognizes a check item 6 that corresponds to a checked check box 61 as a selected check item 6. On the other hand, the processor 20 recognize a check box 61 in which the number of high-density pixels is equal to or less than the predetermined value as an unchecked check box 61. The processor 20 recognizes a check item 6 that corresponds to an unchecked check box 61 as an unselected check item 6. The processor 20 can determine whether a check box 61 is checked in any other manner.

Moreover, based on the pattern images included in the received reference document data 40, the processor 20 checks image quality on the image forming apparatus 1 (step #22). The processor 20 can check image quality with regard to the following check items 6. The processor 20 can check for any symptoms (problems) different from those check items 6.

(1) Abnormal Density—The amount of toner applied (the density of toner per unit area) determines the density of the printed result. A dark part results from a high density of toner per unit area; a light part results from a low density of toner per unit area. The actual density of printing can deviate greatly from the desired density of printing. The processor 20 can check for a problem (symptom) of abnormal density. For example, based on the first, second, and third pattern images 71, 72, and 73, the processor 20 checks for abnormal density. For example, for each strip-like rectangular box (patch images 81, 82, and 83) in the first, second, and third pattern images 71, 72, and 73, a density check reference value is previously defined. For each strip-like rectangular box, the processor 20 calculates the average value of the pixel values. The processor 20 recognizes a color for which the deviation of the average value from the density check reference value falls outside a tolerated density range as a color suffering a problem of abnormal density. The processor 20 recognizes a color for which the deviation of the average value from the density check reference value falls within the tolerated density range as a color not suffering a problem of abnormal density. The processor 20 can check for abnormal density in any other manner.

(2) Abnormal Color Reproduction—In printing, toners of a plurality of colors are overlayed on each other to reproduce different colors. A problem can be present in which the color actually printed deviates significantly from the color desired to be printed. The processor 20 can check for a problem (symptom) of abnormal color reproduction. For example, based on the fourth pattern image 74, the processor 20 checks for abnormal color reproduction. For example, for each cubic box 84 in the fourth pattern image 74, a color reproduction check reference value is previously defined. For each cubic box 84, the processor 20 calculates the average value of the pixel values. The processor 20 recognizes a cubic box 84 in which the deviation of the average value from the corresponding color reproduction check reference value falls outside a previously defined tolerated color reproduction range. The processor 20 recognizes the color of the toner used for the printing of the cubic box 84 outside the tolerated color reproduction range as a color suffering a problem of abnormal color reproduction. If for every rectangular box the deviation of the average value from the corresponding color reproduction check reference value falls within the tolerated color reproduction range, the processor 20 recognizes no problem of abnormal color reproduction. The processor 20 can check for a problem of abnormal color reproduction in any other manner.

(3) Fogging—Fogging is a defect in which, for example, the printed result appears foggy with a slight amount of unnecessary toner. The processor 20 can check for a problem (symptom) of fogging. Based on the reference document data 40, the processor 20 checks for fogging. For example, the processor 20 pays attention to a background (white) region outside the pattern images in the reference document data 40. The processor 20 pays attention to part of the white region, and calculates the average value of the pixel values in that region of interest. If the calculated average value is a pixel value darker than a previously defined fogging check reference value, the processor 20 recognizes a problem of fogging. If the calculated average value is a pixel value lighter than the previously defined fogging check reference value, the processor 20 recognizes no problem of fogging. The processor 20 can check for a problem of fogging in any other manner.

(4) Colored/Black Specks—A defect of colored specks is a defect in which unintended magenta, cyan, or yellow specks of a predetermined or larger size are printed. A defect of black specks is a defect in which unintended black specks of a predetermined or larger size are printed. The processor 20 can check for a defect of colored/black specks. The processor 20 checks for a defect of colored/black specks in the reference document data 40. The processor 20 recognizes a cluster of magenta, cyan, yellow, or black pixels of a predetermined or larger size as a colored/black speck. If the processor 20 recognizes a colored/black speck, it recognizes a problem of colored/black specks. If the processor 20 recognizes no colored/black speck, it recognizes no problem of colored/black specks. The processor 20 can check for a problem of colored/black specks in any other manner.

(5) Colored/White Streaks—Colored streaks denote black, magenta, cyan, or yellow lines. White streaks denote white lines. White streaks result from the absence of a color material (toner) in a part where it should be present. Colored and white streaks are both a symptom characterized by the appearance of lines (unnecessary lines) that are not found in the reference document print image data 11b. The processor 20 can check for a defect of colored or white streaks. The processor 20 can check for a defect of a colored or white line in the reference document data 40 that is not found in the reference document print image data 11b. If the processor 20 finds any, it recognizes a problem of colored/white streaks; if the processor 20 finds none, it recognizes no problem of colored/white streaks. The processor 20 can check for a defect of colored/white streaks in any other manner.

(6) Color Displacement—Color displacement is a problem in which colors are overlaid on each other at displaced positions to produce a color (misplaced color) that is not found in image data. For example, in a case where four lines of different colors, each extending in the main scanning direction and having a width of one dot in the sub scanning direction, are overlaid on each other, if only the line in magenta is displaced five dots in the sub scanning direction, it is printed five dots away from the lines of the other three colors. The line in magenta is not found in image data. Color displacement can be grasped as displacement among the positions at which different colors are printed (the positions at which the respective toners are applied).

The processor 20 can check for a problem of color displacement. For example, based on the fifth, sixth, and seventh pattern images 75, 76, and 77, the processor 20 checks the displacement of different colors relative to black. In each of the fifth, sixth, and seventh pattern images 75, 76, and 77, of combinations of a black line and colored lines, only one combination that serves as a reference lies on a straight line; in any other combinations, colored lines lie at different positions in the sub scanning direction with respect to a black line. The processor 20 recognizes a combination in which a black line and a colored line lie on a straight line.

Based on the recognized straight-line combination, the processor 20 recognizes, for each of magenta, cyan, and yellow, displacement in the sub scanning direction relative to black and, if any, the distance and the direction of the displacement. By contrast, if for all of magenta, cyan, and yellow a combination of a black line and a colored line lying on a straight line is the combination that serves as a reference, the processor 20 recognizes no problem of color displacement. The processor 20 can check for color displacement and determine the degree and direction of color displacement in any other manner.

(7) Abnormal Magnification—Abnormal magnification is a defect in which one or more dots on a sheet are at uneven pitches varying out of a tolerable range. The processor 20 can check for abnormal magnification. For example, based on the eighth, ninth, tenth, and eleventh pattern images 78, 79, 710, and 711, the processor 20 checks for a problem of abnormal magnification. In the reference document print image data 11b, the size of the rectangular boxes (patch images 88 89, 810, and 811) of different colors in the eighth, ninth, tenth, and eleventh pattern images 78, 79, 710, and 711 is previously defined (the reference size). The processor 20 checks the size of the rectangular boxes of different colors. For example, the processor 20 recognizes the dimension of the rectangular boxes of different colors in the main scanning direction. The processor 20 judges a color for which the deviation of the recognize size from the previously defined reference size falls outside a tolerated magnification range to be a color suffering a problem of abnormal magnification. If for every rectangular boxes the deviation of the recognized size from the reference size falls within the tolerated magnification range, the processor 20 recognizes no problem of abnormal magnification. The processor 20 can check for a problem of abnormal magnification in any other manner.

(8) Offsetting—Offsetting denotes a phenomenon in which part of what should have been printed in a previous or earlier session is printed on a sheet in a subsequent session. Part of what should have been printed in an earlier session appears like an afterimage in the printed result. The more visible the phenomenon, the poorer the image quality of the printed result. Here, no image data of the printed result before the printing of the reference document 4 is available, and this can make it difficult for the information processing apparatus 2 (processor 20) to check for a defect of offsetting. Accordingly, the processor 20 can be exempt from the check for a defect of offsetting. In this way, for one or more of the check items 6, the processor 20 may be exempt from the check based on the reference document data 40.

Subsequently, the processor 20 recognizes inconsistent items out of the check items (step #23). An inconsistent item is a check item 6 that has been recognized to have been selected in the check region 5 but that has been judged to be no problem in the check based on the pattern images; it is thus a check item 6 for which there is a discrepancy between the user's view and the result of evaluation of the pattern images in the reference document data 40. The frequency of occurrence of the selected check item 6 should be checked on an actual apparatus. If there is no check item 6 that corresponds to an inconsistent item, the processor 20 judges that there is no inconsistent item.

Moreover, the processor 20 recognizes consistent items out of the check items (step #24). A consistent item is a check item 6 that has been recognized to have been selected in the check region 5 and that has been determined to be a problem in the check based on the pattern images. It is thus possible to extract check items 6 that are likely to need repair. If there is no check item 6 that corresponds to a consistent item, the processor 20 judges that there is no consistent item.

Furthermore, the processor 20 recognizes unchecked items (step #25). An unchecked item is a check item 6 that has been recognized to have been selected in the check region 5 but that has not been subjected to a check based on the pattern images. For example, in a case where the check item 6 for offsetting is checked, the processor 20 recognizes the check item 6 for offsetting as an unchecked item. It is thus possible to recognize a symptom that is of concern to the user. If there is no check item 6 that corresponds to an unchecked item, the processor 20 judges that there is no unchecked item.

The processor 20 makes the information communication circuit portion 24 transmit to the communication apparatus 3 corresponding to the image forming apparatus 1 the result of evaluation of image quality on the image forming apparatus 1 based on the pattern images along with any inconsistent items, consistent items, and unchecked items (step #26). For example, the processor 20 transmits, as the check results, information on any check item 6 that has been judged to be a problem and any color that has been determined to suffer a problem for the check item 6 that has been judged to be a problem.

If the processor 20 finds no inconsistent item, it notifies the communication apparatus 3 corresponding to the image forming apparatus 1 of the absence of any inconsistent item. If the processor 20 finds no consistent item, it notifies the communication apparatus 3 corresponding to the image forming apparatus 1 of the absence of any consistent item. If the processor 20 finds no unchecked item, it notifies the communication apparatus 3 corresponding to the image forming apparatus 1 of the absence of any unchecked item.

The communication apparatus 3 corresponding to the image forming apparatus 1 is, for example, a PC at a company in charge of the maintenance of the image forming apparatus 1. The communication apparatus 3 corresponding to the image forming apparatus 1 can instead be a communication apparatus 3 (for example, a smartphone) that is carried by a maintenance staff member in charge of the image forming apparatus 1. The destination of the transmission by the processor 20 can be the address, attached to the condition check data, of the maintenance staff member in charge of the image forming apparatus 1

The processor 20 can supplement the information on the check results, inconsistent items, consistent items, and unchecked items with information that identifies the image forming apparatus 1. For example, the processor 20 can add such information as the manufacture number, serial number, and model name of the image forming apparatus 1 and the names of users of the image forming apparatus 1.

Moreover, the processor 20 makes the information communication circuit portion 24 transmit to the image forming apparatus 1 that has transmitted the reference document data 40, along with the check results of image quality on the image forming apparatus 1 based on the pattern images, the inconsistent items, consistent items, and the unchecked items (step #27). The information transmitted to the image forming apparatus 1 can be the same as that to the communication apparatus 3. The check results can be conveyed to the user.

Furthermore, the processor 20 updates statistical data 25 (step #28). A nonvolatile storage device in the information storage portion 21 stores the statistical data 25. The information processing apparatus 2 receives the reference document data 40 from a plurality of image forming apparatuses 1. The statistical data 25 is data that comprises, for each model and each check item 6, the number of times that it has been selected in the check region 5. If there is any selected check item 6 in the check region 5 in the reference document data 40, the processor 20 updates the statistical data 25. Specifically, the processor 20 increments by one the number of times (value) for any check item 6 selected for the model of the image forming apparatus 1 from which the reference document data 40 has been received.

The statistical data 25 may include, for each model, the number of times of occurrence of a symptom that has been judged to be a problem based on the pattern images. The processor 20 may update the statistical data 25 if there is a symptom that has been judged to be a problem based on the pattern images in the reference document data 40. Specifically, with respect to the statistical data 25, for the model of the image forming apparatus 1 from which the reference document data 40 has been received, the processor 20 increments by one the number of times of occurrence of a symptom that has been judged to be a problem. In this way, it is possible to acquire, for each model, data useful to grasp symptoms that are likely to occurs As described above, an image evaluation system 100 according to an embodiment includes an image forming apparatus 1 and an information processing apparatus 2. The image forming apparatus 1 prints a reference document 4 that includes pattern images for evaluation of image quality in printing. The image forming apparatus 1 prints, on the reference document 4, a check region 5 that includes check items 6 regarding the image quality of the printed result. The image forming apparatus 1 reads the printed reference document 4 and generates reference document data 40, which is the image data of the reference document 4. The image forming apparatus 1 transmits the generated reference document data 40 to the information processing apparatus 2. The information processing apparatus 2 receives the reference document data 40. Based on the received reference document data 40, the information processing apparatus 2 recognizes any check item 6 selected in the check region 5.

In this way, the check items 6 (check region 5) can be printed on the reference document 4. The user can make a selected check item 6 apparent by putting a mark on the reference document 4. Information on a symptom that the user perceives as a problem (a symptom of concern) is transmitted to the information processing apparatus 2. The information processing apparatus 2 can acquire image data (pattern images) for image quality evaluation and data (check items 6) indicating a symptom of concern at the same time. That is, based on the pattern images, the information processing apparatus 2 can evaluate and diagnose the condition of the image forming apparatus 1. In addition, by recognizing a selected check item 6, the information processing apparatus 2 can simultaneously grasp a symptom of concern to the user.

Without talking to the user in person, it is possible to grasp a symptom of concern to the user. Before a visit to the user, it is possible to correctly grasp a symptom of concern to the user. This may make it possible to grasp a symptom that is not apparent in the reference document data 40. It is thus possible to fully grasp before a visit the condition of the image forming apparatus 1 and the concern to the user. Thus, it is possible to grasp before a visit all the replacement parts necessary for maintenance. A serviceperson does not have to return to the company to fetch replacement parts. This reduces the time required for maintenance. It is thus possible to shorten the time for which image quality remains degraded.

The image forming apparatus 1 prints a combination of check items 6 with check boxes 61 in the check region 5. The information processing apparatus 2 recognizes a check item 6 for which the check box 61 is checked as a selected check item 6. The information processing apparatus 2 recognizes a check item 6 for which the check box 61 is unchecked as an unselected check item 6. Thus the user can, simply by checking a check box 61, select a check item 6; he or she can select a check item 6 easily. The information processing apparatus 2 can, simply by checking for a check mark, correctly recognize whether a check item 6 is selected or not.

Based on the pattern images included in the received reference document data 40, the information processing apparatus 2 evaluate image quality in printing on the image forming apparatus 1. It is thus possible to judge (diagnose) based on the image data of the printed result of the reference document 4 the condition of the image forming apparatus 1, the presence or absence of a symptom undesirable in terms of image quality, and a symptom that is present. It is possible to grasp the condition of the image forming apparatus 1.

Based on the pattern images, the information processing apparatus 2 checks for a problem with respect to a check item 6. The information processing apparatus 2 recognizes a check item 6 that is recognized to have been selected but that has been judged to be no problem based on the pattern images as an inconsistent item. It is thus possible to sort out a check item 6 (symptom of concern) that has not been recognized based on the pattern images but that the user has selected. It can thus be understood that a symptom of concern does not always occur. It is possible to grasp a problem in image quality that is considered not to be occurring all the time.

The information processing apparatus 2 transmits a inconsistent item to a communication apparatus 3 that corresponds to the image forming apparatus 1. It is thus possible to convey an inconsistent item to the company or serviceperson in charge of the maintenance of the image forming apparatus 1. Information useful for checking and repair can be conveyed to the serviceperson. Here, a communication apparatus 3 that corresponds to the image forming apparatus 1 can be a PC at the maintenance company of the image forming apparatus 1, or a mobile communication apparatus 3 (mobile phone, smartphone) carried by the serviceperson.

Based on pattern images, the information processing apparatus 2 checks for a problem with respect to a check item 6. The information processing apparatus 2 recognizes a consistent item which is a check item 6 that is recognized to have been selected and that has been judged to be a problem based on the pattern images. It is thus possible to grasp a symptom (problem) that is of concern to the user and that in addition is clearly apparent in the reference document data 40. It is possible to reliably grasp a problem in image quality to be dealt with by repair.

The information processing apparatus 2 transmits a consistent item to the communication apparatus 3 that corresponds to the image forming apparatus 1. It is thus possible to convey a consistent item to the company or serviceperson in charge of the maintenance of the image forming apparatus 1. Information useful for checking and repair can be conveyed to the serviceperson.

The information processing apparatus 2 receives the reference document data 40 from a plurality of image forming apparatuses 1. The information processing apparatus 2 counts, for each model and for each check item 6, the number of times that the check item 6 has been selected in the check region 5. In this way, it is possible to obtain statistical data for a selected check item 6. It is possible to grasp, for each model and for each check item 6, whether the check item 6 is selected frequently or not. It is possible to obtain statistical data useful to arrange when to perform maintenance as by replacing ahead of time a part associated with a frequently selected check item 6. It is then easier to grasp a problem (symptom) to be dealt with with priority. It is possible to obtain statistical data useful to the development of the image forming apparatus 1.

An image forming apparatus 1 according to the present disclosure includes a printer portion 16, a scanner portion 14, a communication circuit portion 10*d*, and a controller 10. The printer portion 16 prints a reference document 4 that includes pattern images for evaluation of the image quality of the printed result. The scanner portion 14 reads the printed reference document 4. The communication circuit portion 10*d* transmits to the information processing apparatus 2 reference document data 40 which is image data generated through the reading of the reference document 4. The controller 10 makes the printer portion 16 print on the reference document 4 a check region 5 that shows previously defined check items 6 with respect to the image quality of the printed result. In this way, the check items 6 (check region 5) can be printed on the reference document 4. A selected check item 6 can be made apparent by the user putting a mark on the reference document 4. The image forming apparatus 1 transmits to the information processing apparatus 2 evaluation images (pattern images) along with information on a symptom of concern to the user. The information processing apparatus 2 can simultaneously acquire the pattern images and the information on a symptom of concern to the user.

According to the present disclosure, an information processing apparatus can simultaneously acquire image data for image quality evaluation and information on a symptom that a user perceives as of concern. It is possible to efficiently and promptly check image quality and grasp a symptom of concern to the user in terms of image quality.

While an embodiment of the present disclosure has been described, it is not meant to limit the scope of the present disclosure, which thus allows for various modifications without departure from the spirit of the present disclosure.

The present disclosure is applicable to a system that includes an image forming apparatus and an information processing apparatus.

What is claimed is:

1. An image evaluation system comprising an image forming apparatus and an information processing apparatus, wherein
the image forming apparatus
prints a reference document including a pattern image for evaluating image quality in printing,
prints on the reference document a check region including a check item with respect to image quality of a printed result,
reads the reference document printed and generates reference document data as image data of the reference document, and
transmits the reference document data generated to the information processing apparatus, and
the information processing apparatus
receives the reference document data,
based on the reference document data received, recognizes the check item selected in the check region,
based on the pattern image included in the reference document data received, evaluates image quality in printing on the image forming apparatus,
based on the pattern image, checks for a problem with respect to the check item, and
recognizes the check item that is recognized to have been selected but that has been judged to be no problem based on the pattern image as an inconsistent item.

2. The image evaluation system according to claim 1, wherein
the image forming apparatus prints in the check region a combination of the check item and a check box, and
the information processing apparatus
recognizes the check item having the check box corresponding thereto checked as the check item selected and
recognizes the check item having the check box corresponding thereto not checked as the check item unselected.

3. The image evaluation system according to claim 1, wherein
the information processing apparatus transmits the inconsistent item to a communication apparatus corresponding to the image forming apparatus.

4. An image evaluation system comprising an image forming apparatus and an information processing apparatus, wherein
the image forming apparatus
prints a reference document including a pattern image for evaluating image quality in printing,
prints on the reference document a check region including a check item with respect to image quality of a printed result,
reads the reference document printed and generates reference document data as image data of the reference document, and
transmits the reference document data generated to the information processing apparatus, and
the information processing apparatus
receives the reference document data and,
based on the reference document data received, recognizes the check item selected in the check region,
based on the pattern image included in the reference document data received, evaluates image quality in printing on the image forming apparatus,
based on the pattern image, checks for a problem with respect to the check item, and
recognizes the check item that is recognized to have been selected and that has been judged to be a problem based on the pattern image as a consistent item.

5. The image evaluation system according to claim 4, wherein
the information processing apparatus transmits the consistent item to a communication apparatus corresponding to the image forming apparatus.

6. An image evaluation system comprising an image forming apparatus and an information processing apparatus, wherein
the image forming apparatus
prints a reference document including a pattern image for evaluating image quality in printing,
prints on the reference document a check region including a check item with respect to image quality of a printed result,
reads the reference document printed and generates reference document data as image data of the reference document, and transmits the reference document data generated to the information processing apparatus, and the information processing apparatus receives the reference document data, based on the reference document data received, recognizes the check item selected in the check region, receives the reference document data from a plurality of the image forming apparatuses, and counts, for each model and for each of the check item, a number of times that the check item has been selected in the check region.

7. The image evaluation system according to claim 4, wherein the image forming apparatus prints in the check region a combination of the check item and a check box, and the information processing apparatus recognizes the check item having the check box corresponding thereto checked as the check item selected and recognizes the check item having the check box corresponding thereto not checked as the check term unselected.

8. The image evaluation system according to claim 6, wherein the image forming apparatus prints in the check region a combination of the check item and a check box, and the information processing apparatus recognizes the check item having the check box corresponding thereto checked as the check item selected and recognizes the check item having the check box corresponding thereto not checked as the check item unselected.

\* \* \* \* \*